(No Model.)
J. J. HOGAN.
COUPLING FOR UNITING PIPES TO FITTINGS.
No. 459,910. Patented Sept. 22, 1891.
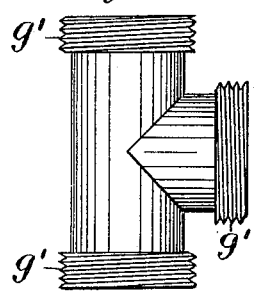
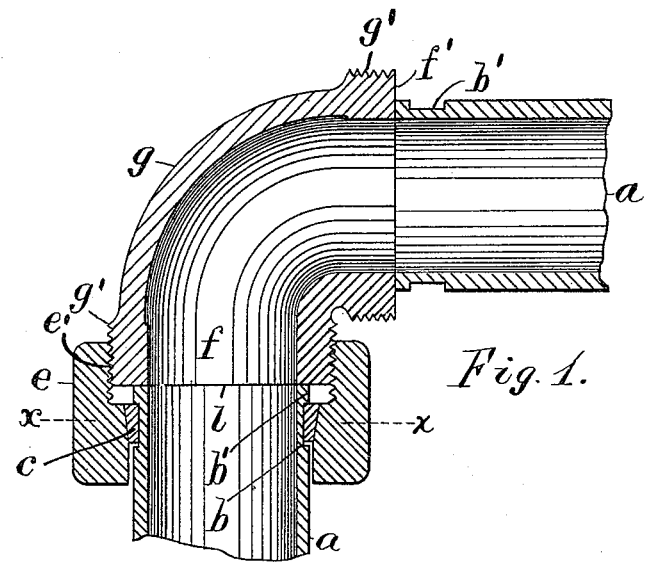
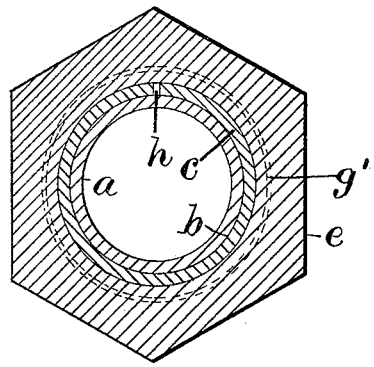
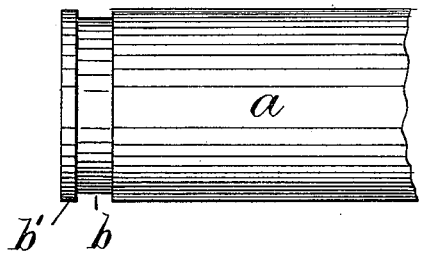
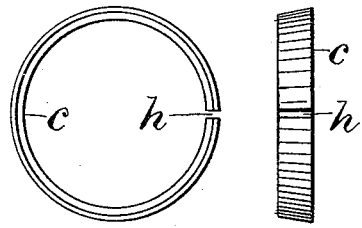
Attest:
F. C. Fischer
J. Van Nest Jr.
Inventor.
John J. Hogan, per
Crane & Miller, Attys.

UNITED STATES PATENT OFFICE.

JOHN J. HOGAN, OF BROOKLYN, ASSIGNOR TO THE HOGAN ENGINEERING COMPANY, OF NEW YORK, N. Y.

COUPLING FOR UNITING PIPES TO FITTINGS.

SPECIFICATION forming part of Letters Patent No. 459,910, dated September 22, 1891.

Original application filed June 14, 1888, Serial No. 277,111. Divided and this application filed November 15, 1889. Renewed March 9, 1891. Serial No. 384,376. (No model.)

*To all whom it may concern:*

Be it known that I, JOHN J. HOGAN, a citizen of the United States, residing at Brooklyn, county of Kings, State of New York, have invented certain new and useful Improvements in Couplings for Uniting Pipes to Fittings, fully described and represented in the following specification and the accompanying drawings, forming a part of the same.

This application is a division of my application, Serial No. 277,111, filed June 14, 1888, for improvement in collared pipe-couplings.

The object of the present invention is to couple pipes to fittings by means of a butt-joint and without cutting a thread upon the exterior of the pipes. By this construction the pipes can be made the exact length between the various fittings and coupled together without any subsequent variation in the length, which variation is likely to occur where screw-threads are employed.

By the use of my invention all the joints in a system of pipes and fittings are rendered union-joints, and no unions are required to permit the introduction of any portion into the system or the removal of any pipe or fitting therefrom.

The invention consists in the combination, with a fitting having a nozzle provided with external thread and flat face, of a pipe with squared end to fit such face and having a rectangular groove in the periphery of the pipe adjacent to its end, an elastic ring divided at one side to spring into such groove and a sleeve formed with conical exterior, and a sleeve fitted to slip over the pipe end and provided internally with a conical seat to fit the exterior of the ring and with a screw-thread for application to the fitting.

In the drawings, Figure 1 is a central section of an elbow and pipe end united by my coupling. Fig. 2 is a section through the coupling on line $xx$ in Fig. 1. Fig. 3 is a side view of the pipe end. Fig. 4 is an end view, and Fig. 5 a side view, of the divided ring; and Fig. 6 is a view of a T adapted for use with my coupling.

$g$ is the elbow with bore $f$.

$f'$ is a flat face at each end of the elbow, and $g'$ a screw-thread formed upon the exterior of the nozzle adjacent to the same.

$a$ is a part of a pipe provided with rectangular shallow groove $b$ adjacent to the end, forming a collar $b'$ upon the end of the pipe.

$c$ is the elastic ring, shown with notch $h$ in one side of the same, and having a conical exterior fitted to a corresponding seat within the sleeve $e$, which is furnished with internal thread $e'$ to fit the thread $g'$ upon the nozzle of the fitting. The ring is shown in the drawings heavier than would be necessary to perform its functions, in order to show its construction clearly, as it would in practice be made thin enough to open at the division $h$ to slip over the collar $b'$ into the groove $b$, with its larger side toward the end of the pipe. The pipe is coupled to the fitting by first slipping the sleeve over the end of the same far enough to apply the ring to the groove. The collar is then pulled forward upon the ring and screwed upon the thread $g'$ on the fitting, by which the ring is compressed very firmly upon the pipe and the pipe drawn rigidly into contact with the flat face $f'$ upon the fitting.

The pipe-ring operates to move the pipe longitudinally toward the fitting by the contact of its forward corner with the collar $b'$, and as the ring is tightly compressed in the groove by the external sleeve the groove may be made very shallow and still perform its functions effectively.

A packing-washer $l$, of copper or lead, adapted to prevent leakage, but not to yield under the ordinary strains to which the joint is subjected, may be inserted between the end of the pipe and the face $f'$, and a joint which is square, rigid, and water-tight may thus be produced. Such washer is not required if the end of the pipe and the face $f'$ are made smooth and true.

A T is shown in Fig. 6 provided with nozzles having screw-threads $g'$ and flat faces $f'$, the same as shown upon the elbow in Fig. 1, and is thus adapted to receive a pipe end and sleeve at any of such nozzles, and other fittings, as Y's and branches, may be provided with similar nozzles and coupled to pipe ends in the manner already described.

The groove $b$ is in practice formed upon the pipe end by a slight modification of the thread-cutters used in cutting threads on pipe by using a special die or cutting-tool. As the groove may thus be formed by the same tools as are already in general use for cutting pipe, it is obvious that an operator may readily cut the pipes to the required lengths and fit them for coupling without the use of screw-dies. The process of coupling pipes together is thus greatly facilitated, while the formation of square joints between the pipe ends and the fittings renders each joint a union-joint and facilitates the removal of any pipe or fitting from a system without moving or deranging any other parts.

I am aware of United States Patents Nos. 324,874, dated August 25, 1885, and 323,567, dated August 4, 1885, which show a construction for forming a joint upon a compressible packing upon the exterior of the pipe by means of a collar clamped thereon. With such construction the fluid within the pipe is not confined wholly to the inside of the pipe, but can operate upon the exterior of the pipe to the point where the packing is applied. My invention differs from these in having the joint formed at the end of the pipe itself, by which construction the fluid within the pipe is prevented from passing into contact with the outside of the pipe at any points, and the invention is thus adapted for use in confining acids and other corrosive liquids in pipes having a lining adapted to resist such liquids.

My invention also differs from these in being operative without the application of any packing whatever, as the small area of the pipe end may with my construction be crowded forcibly against the opposite fitting to make a joint thereat. Although such patents show in the one case a groove with a collar divided in two halves for application to the grooves and in the other case a conical collar divided at one side to fit upon the pipe, my construction differs from both in its functions, as my collar is not employed to make a joint upon the packing, as in the said patents. I hereby disclaim the said patents and any construction different from that claimed herein.

Having thus set forth the nature of my invention, what I claim herein is—

The combination, with a fitting having a nozzle provided with external thread $g'$ and face $f'$, of a pipe fitted to press upon such face and having a rectangular groove $b$ in the periphery of the pipe adjacent to its end, the elastic ring $e$, divided at one side to spring into such groove and formed with conical exterior, and the sleeve $c$, fitted to slip over the pipe end and provided internally with the conical seat to fit the exterior of the ring and an internal screw-thread for application to the fitting.

In testimony whereof I have hereunto set my hand in the presence of two subscribing witnesses.

JOHN J. HOGAN.

Witnesses:
  CHAS. W. CHAPIN,
  WM. F. M. ROGERS.